Patented Nov. 15, 1949

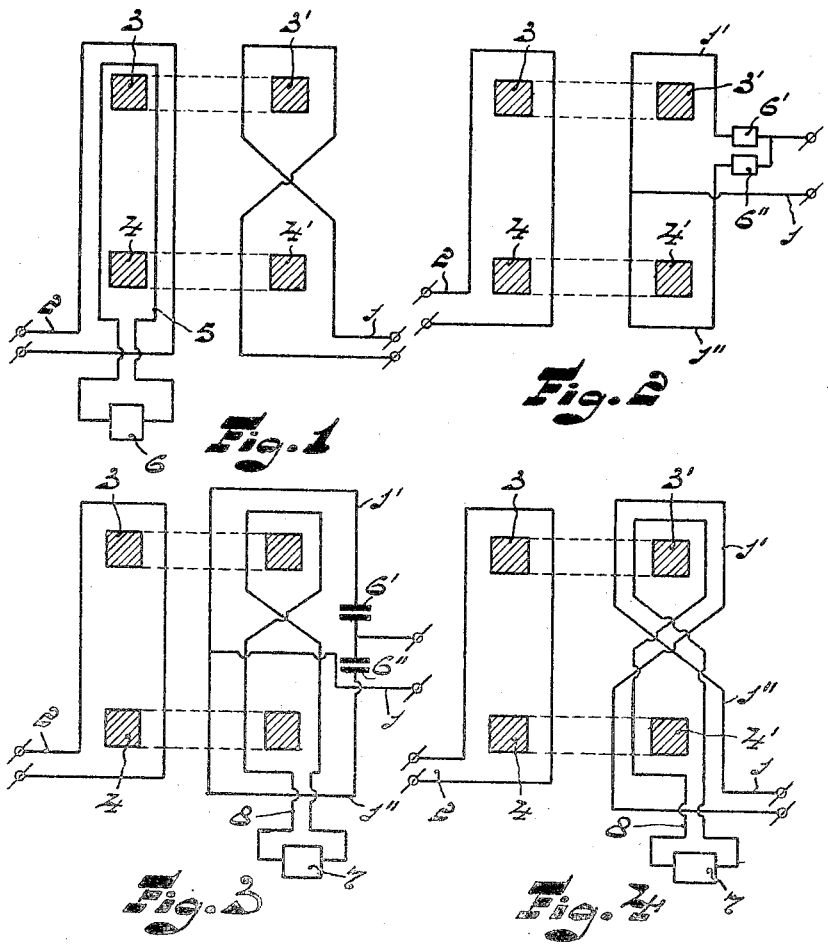

2,488,370

UNITED STATES PATENT OFFICE 2,488,370

CIRCUIT ARRANGEMENT FOR VARYING THE INDUCTANCE OF COILS

Willem Wigger Boelens, Gerard Hepp, Jacob van Slooten, and Bernardus W. van Ingen Schenau, Eindhoven, Netherlands, assignors to Hartford National Bank and Trust Company, Hartford, Conn., as trustee Application November 22, 1946, Serial No. 711,686
In the Netherlands September 6, 1945

Section 1, Public Law 690, August 8, 1946
Patent expires September 6, 1965

3 Claims. (Cl. 332—51)

This invention relates to a circuit for varying the inductance of a coil having a ferromagnetic core, as a function of a control current flowing through a magnetising winding, the magnetisation of at least part of the core being determined by the control current.

Circuits of this kind are frequently utilised for modulating the phase or the frequency of electrical oscillations, or for obtaining automatic tuning correction of receivers of electro-magnetical oscillations and more particularly for acting upon the amplitude, the phase or the frequency of electrical oscillations.

It is known in such circuits to decouple the coil and the magnetising winding by division of the coil and/or of the magnetising winding, preferably by division of the coil, and connection in opposition (push-pull connection) of the parts.

Applicant has found that the use of the circuit above described frequently involves undesirable effects in practice, which prevents satisfactory operation. Thus, for example, the said circuit often does not permit of obtaining undistorted modulation of electrical oscillations. The invention is based on the recognition that the occurrence of these undesirable effects is due to insufficient magnetic decoupling of the coil with respect to the magnetising winding.

According to the invention, further decoupling of the coil with respect to the magnetising winding is obtained by that either the magnetising winding itself, or a winding magnetically coupled thereto is short-circuited with respect to the range of frequencies of the electrical oscillations occurring in the coil, and/or by that either the coil itself, or a winding magnetically coupled thereto is short-circuited with respect to the range of frequencies of the control current.

Under certain conditions the coil itself may serve as the short-circuiting winding coupled to the magnetising winding. For this purpose the coil is composed of at least two parts connected so that the inductance of the coil is produced by parallel connection of the two parts, the latter furthermore consituting a winding which is coupled to the magnetising winding and short-circuited in itself with respect to the range of frequencies of the electrical oscillations occurring in the coil.

Use is preferably made of a short-circuiting winding (coupled to the magnetising winding), the natural frequency of which is higher than the highest frequency of the frequency range of the said electrical oscillations.

In order that the invention may be clearly understood and readily carried into effect, it will now be described more fully with reference to the accompanying drawing.

Fig. 1 shows diagrammatically a circuit adapted for acting upon the inductance of a coil 1 as a function of a control current flowing through a magnetising winding 2. For the sake of clearness each of the windings is shown as only one winding. In practice, however, the windings usually consist of a plurality of turns.

The coil 1 is assumed to pertain to an oscillatory circuit producing oscillations modulated in phase or in frequency. The modulation of the oscillations produced in the oscillatory circuit is obtained by varying the inductance of the coil 1 in the rhythm of the control current. Consequently, in the case assumed a high-frequency current occurs in the coil 1 and a low-frequency current occurs in the magnetising winding 2. It is emphatically pointed out, however, that the assumptions made are not essential to the invention.

Both the coil 1 and the magnetising winding 2 are arranged on the same ferromagnetic core, constituted by two closed rings 3—3' and 4—4' of so-called high-frequency iron. The magnetisation of the rings and, consequently, the inductance of the coil 1 are determined by the control current flowing in the magnetising winding 2. If no particular precautions were taken, a low-frequency voltage would be induced in the coil 1 by the low-frequency control current and a high-frequency voltage would be induced in the magnetising winding 2 by the high-frequency current, thus preventing proper modulation. For this reason the coil 1 is composed of two parts surrounding respectively the rings 3' and 4' and connected in opposition (in push-pull) in such manner that the resulting low-frequency voltage induced by the magnetising winding is approximately zero. It is also possible for one or more turns to be wound alternately on one and on the other ring, the turns being connected in series in the manner shown in the figure.

In the practical example the magnetising winding consists of turns surrounding the two rings at the same time, and hence of one coil. This form of construction affords particular advantages which will be discussed later in this description. However, it is also possible for the winding to be composed of two or more parts which in the present instance surround the rings in the same sense and are connected in series. It may be observed that in the case of a magnetising winding constituted by one coil, use may be made with advantage of a three-limbed ferromagnetic circuit, in which event the magnetising winding is arranged on one of the limbs (corresponding to the combination of the ring-sections 3 and 4) and the halves of the high-frequency coil 1 are arranged on the other limbs respectively.

Applicant has found that the circuit set out in the foregoing does not always permit of obtaining undistorted phase modulation or frequency modulation. According to the invention, this distortion is attributable to insufficient decoupling of the coil and of the magnetising winding, which may be understood as follows. The said division of the coil 1 and the push-pull connection of the two parts, regarded superficially, would allow almost complete decoupling of the coil and of the magnetising winding, neglecting saturation of the ferromagnetic cores. However, such decoupling can only occur if the two rings 3—3' and 4—4' and the two parts of the coil are and remain wholly uniform both as regard dimensions and magnetic properties. Furthermore, this must be the case for any value of the inductance brought about by the control current. This condition, however, never fulfilled in practice by the circuit described. If a little crack occurs or extends, for example, in one of the two rings, the balance of the push-pull connection is completely disturbed. Even if for determined values of the control current complete decoupling were obtained, this decoupling would, as a rule, be disturbed upon variation of the control current due to the non-linear relation between the control current and the resulting inductance. Such disturbance usually causes serious difficulties, since it is possible that part of the magnetising winding have a natural frequency equal to the frequency of the high-frequency oscillations produced in the coil 1. In this case even a small coupling between the magnetising winding 2 and the coil 1 is sufficient to bring the said parts into resonance. Due to these resonance currents the inductance in the rings 3'—4' differs from the value which it would require at the prevailing value of the control current, from which ensue considerably deviations from the proper reactance value of the coil 1 and serious distortion in the modulation.

According to the invention, the said coupling is reduced almost completely to zero by the provision of a winding magnetically coupled to the magnetising winding and short-circuited with respect to the frequency range of the high-frequency oscillations. Further, saturation of the cores will produce a second harmonic of the frequency of the current in the coils. This second harmonic may be reduced by the use of the invention. In Figure 1 this winding is designated 5; it is short-circuited through a network 6 (shown diagrammatically), which passes oscillations of the frequency range of the high-frequency oscillations but which has a high impedance to oscillations of the frequency range of the low-frequency control current.

The short-circuiting winding 5 is magnetically coupled to the magnetising winding 2 but is not magnetically coupled to the coil 1. The short-circuiting winding may be constituted by a single turn, preferably large; it is, however, also possible for the winding to be composed of a plurality of turns. Provision is usually made for the short-circuiting winding 5 to have a natural frequency higher than the highest frequency of the high-frequency oscillations. The network 6 may be constituted, for example, by a properly chosen condenser.

In order to ensure as firm as possible a coupling between the short-circuiting winding and the magnetising winding, it is desirable to provide the winding 5 between the ferromagnetic core 3—4 and the magnetising winding 2; it is also possible to provide the winding 5 between the ferromagnetic core 3'—4' and the coil 1. In either case a coupling between the coil 1 and the winding 2 resulting from leakage fields, if any, is avoided as much as possible.

In connection with the foregoing it may be remarked that it is advantageous to realize the magnetising winding 2 as one coil, since in this case the possibility of parts of the winding being set into resonance for the high-frequency oscillations is smallest. If, on the one hand, the magnetising winding would be equipped with two separate coils, one around each ring (and if the action of the short-circuiting winding 5 is disregarded for a moment), then the natural resonance of the coils will, as a rule, differ from each other and the high-frequency voltages induced in the said coils will not neutralize each other even approximately, in other words, the known decoupling by means of division and push-pull connection is then not so good as in the event of the winding 2 being constituted by one coil.

Figure 2 shows a circuit in which the coil 1 serves at the same time as the short-circuiting winding. Te coil 1 is constituted by two parts 1' and 1", which surround the rings 3' and 4' respectively. The inductance of the coil 1 is produced by parallel connection of the parts 1' and 1". The parts 1' and 1" also constitute a winding coupled to the magnetising winding 2 and short-circuited in series in itself, i. e. the series-connection of 1' and 1" implies a short-circuiting winding for the high-frequency oscillations but no short-circuiting winding for the low-frequency oscillations owing to the fact that the supply leads include two networks 6' and 6" having a high impedance to oscillations of the frequency range of the control current and a low impedance to oscillations of the frequency range of the high-frequency oscillations. Each of the networks 6' and 6" may be constituted by a properly chosen capacity. The circuit shown in Figure 2, in which the two parts of the coil 1 are connected in parallel, affords the further advantage that the two parts may be included in the high-frequency portion of the circuit (not shown in the figure) so as to obtain a symmetrical arrangement in which each of the parts has the same capacity with respect to earth. The series-connection shown in Figure 1 does not exhibit this advantage.

Under certain conditions it is possible to short-circuit the magnetising winding itself with respect to the high-frequency oscillations. This can only be effected, however, if the number of turns of the magnetising winding is comparatively small and, consequently, the control current has a comparatively high value, otherwise parts of this winding will yet come into resonance with the high-frequency oscillations and the effect aimed at is not achieved. The short-circuiting operation may be effected, for example, by means of a condenser provided between the terminals of the winding 2.

In order to reduce the coupling between the coil and the magnetising winding it is possible, also according to the invention, to short circuit either the coil itself, or a winding magnetically coupled thereto with respect to the frequency range of the control current. This step may be taken separately, or in combination with the other step set out above.

Figure 3 shows a circuit in which the two steps are used in combination. The circuit is wholly identical to that shown in Figure 2, except for the presence of a winding 8, coupled to the coil 1 and short-circuited through a net-work 7. The latter has a low impedance for oscillations of the frequency range of the control current but a high impedance for oscillations of frequencies falling within the range of frequencies of the high-frequency oscillations. The network 7 may be constituted, for example, by a coil of properly chosen inductance.

The operation of the short-circuiting winding 8 will be explained with reference to the circuit shown in Figure 4, which largely corresponds to that shown in Figure 1. In this circuit, however, the short-circuiting winding 5 is superseded by the short-circuiting winding 8 firstly has the effect that the magnetic fluxes in the two rings are rendered equal to each other (if they should be unequal) and remain equal at any arbitrary value of the control current. If, furthermore the rings are of same diameter, the magnetic inductance in the two rings is and remains equal, independently of the value of the control current. This, however, applies to the low-frequency magnetic fluxes but does not apply to the high-frequency magnetic fluxes, since the winding 8 is not short-circuited with respect to high-frequency oscillations. By suitably proportioning the push-pull connected parts 1' and 1" of the coil (supported as the case may be, by the provision of a short-circuiting winding 5), the coil 1 also may be decoupled for high-frequency current with respect to the magnetising winding 2. This may now be effected in a simple manner since this decoupling no longer depends on the low-frequency control current. The desired decoupling once being obtained, it is not disturbed by variations on the control current (which, of course, continuously occur in modulating the high-frequency oscillations). This is attributable to the fact that invariably the same magnetisation prevails in each of the rings, so that the non-linearity in the relationship between magnetisation and control current can no longer disturb the balance of the push-pull connection.

On comparing the functions of the short-circuiting windings 5 and 8 we can say that the short-circuiting winding 8 tends to counteract the cause of asymmetries in the push-pull connection and that the short-circuiting winding 5 tends to neutralize the consequences of existing asymmetries. Consequently, the windings may advantageously supplement each other in their functions.

In the circuit shown in Figure 1 it is possible, if desired, to short-circuit the coil 1 itself for the frequency range of the control current oscillations through a suitably chosen impedance, for example a high inductance. This may in some cases be effected with advantage, since an inductance of the high-frequency oscillatory circuit, which includes the coil, is connected in parallel with the coil 1.

If the control current only comprises oscillations of very low frequencies, the networks 6', 6, 6" may often be replaced by a direct short-circuit. At these low frequencies the voltages induced in the short-circuiting winding are so small that the resistance and/or the inductance of the short-circuiting winding are in most cases sufficiently high to prevent considerable currents of the frequencies contained in the control current from flowing in the said winding, due to which the magnetising winding would otherwise be short-circuited for these frequencies. If desired, resistance wire may be used for the short-circuiting winding.

What we claim is:

1. A circuit arrangement to provide a variable inductance comprising, a first inductive winding element having an oscillatory current flowing therein of a given frequency determined in part by the inductance of said first inductive winding element, a second inductive winding element having an oscillatory current flowing therein of a frequency lower than the frequency of the current in the first inductive element, ferromagnetic means to couple said first inductive element and second inductive element, and a third inductive winding element coupled to said ferromagnetic means and connected in parallel and in phase opposition with said first inductive winding element.

2. A circuit arrangement to provide a variable inductance comprising, a first inductive winding element having an oscillatory current flowing therein of a given frequency determined in part by the inductance of said first inductive winding element, a second inductive winding element having an oscillatory current flowing therein of a frequency lower than the frequency of the current in the first inductive element, ferromagnetic means to couple said first inductive element and second inductive element, a third inductive winding element coupled to said ferromagnetic means and connected in parallel and in phase opposition with said first inductive winding element, a fourth winding element coupled by the said ferromagnetic means to the said first inductive winding element, and in impedance network connected electrically in series with said fourth inductive winding element and of proper magnitude to short-circuit oscillatory current frequencies found in the second inductive winding element.

3. A circuit arrangement to provide a variable inductance comprising, a first inductive winding element having an oscillatory current flowing therein of a given frequency determined in part by the inductance of said first inductive winding element, a second inductive winding element, having an oscillatory current flowing therein of a frequency lower than the frequency of the current in the first inductive element, ferromagnetic means to couple said first inductive element and second inductive element, and a third inductive winding element coupled to the said ferromagnetic means, said third winding element short-circuiting one of the said oscillatory current frequencies and having a natural frequency of oscillation higher than the first inductive winding element oscillatory current.

WILLEM WIGGER BOELENS.
GERARD HEPP.
JACOB van SLOOTEN.
BERNARDUS W. van INGEN SCHENAU.

REFERENCES CITED

The following references are of record in the file of this patent:

UNITED STATES PATENTS

| Number | Name | Date |
| --- | --- | --- |
| 1,462,038 | Hartley | July 17, 1923 |
| 1,706,139 | Boyajian | Mar. 19, 1929 |
| 1,849,845 | Mayo | Mar. 15, 1932 |
| 1,953,519 | Tritschler | Apr. 3, 1934 |
| 1,955,317 | Wentz | Apr. 17, 1934 |
| 2,284,406 | D'Entremont | May 26, 1942 |